US005784547A

United States Patent [19]
Dittmar et al.

[11] Patent Number: 5,784,547
[45] Date of Patent: Jul. 21, 1998

[54] METHOD FOR FAULT-TOLERANT COMMUNICATION UNDER STRICTLY REAL-TIME CONDITIONS

[75] Inventors: Ewald Dittmar, Ludwigshafen; Hans-Dieter Kochs, Duisburg; Holger Hilmer, Moers, all of Germany

[73] Assignee: ABB Patent GmbH, Mannheim, Germany

[21] Appl. No.: 617,124

[22] Filed: Mar. 18, 1996

[30] Foreign Application Priority Data

Mar. 16, 1995 [DE] Germany ............... 195 09 558.8

[51] Int. Cl.$^6$ ..................................... G06F 11/00
[52] U.S. Cl. ................ 395/182.02; 395/185.09
[58] Field of Search ................... 395/180, 181, 395/182.01, 182.08, 185.01, 185.04, 185.09, 182.02, 185.08, 183.19; 361/62, 67

[56] References Cited

U.S. PATENT DOCUMENTS

| | | | |
|---|---|---|---|
| 4,412,281 | 10/1983 | Works . | |
| 5,086,499 | 2/1992 | Mutone | 395/182.01 |
| 5,329,521 | 7/1994 | Walsh et al. . | |
| 5,345,566 | 9/1994 | Tanji et al. . | |
| 5,365,512 | 11/1994 | Combs et al. | 395/182.02 |
| 5,379,278 | 1/1995 | Safadi . | |
| 5,448,561 | 9/1995 | Kaiser et al. | 340/825.51 |
| 5,469,150 | 11/1995 | Sitte | 340/825.07 |
| 5,485,576 | 1/1996 | Fee et al. | 395/185.09 |
| 5,631,854 | 5/1997 | Riley | 364/572 |

FOREIGN PATENT DOCUMENTS

| | | | |
|---|---|---|---|
| 0 321 907 | 6/1989 | European Pat. Off. | H04L 11/16 |
| 0 541 508 A2 | 5/1993 | European Pat. Off. | G06F 11/20 |
| 33 28 405 C2 | 2/1985 | Germany | G06F 11/16 |
| 36 28 299 C2 | 2/1988 | Germany | G06F 11/16 |
| 36 44 019 C2 | 4/1988 | Germany | G06F 11/30 |
| 42 42 438 C2 | 6/1994 | Germany | H04L 12/24 |
| 88/01410 | 2/1988 | WIPO | G06F 11/16 |
| 90/09631 | 8/1990 | WIPO | G06F 11/60 |

OTHER PUBLICATIONS

"Automatic switching of two data transmission channels for increasing availability", Koch Systembusse, 1993, pp. 10–14.

"Reliable computer for KEz–Electronics", Neumann, Reliable KEz–Electronics, 1994, 8th edition, paper No. 6, pp. 360–361.

"Field bus for industrial base", Design and Electronics, 1994 pp. 78–80.

"CAN–An–Auto–Bus", Lawrenz, Field Bus System, 1992, pp. 46–50.

Primary Examiner—Albert Decady
Attorney, Agent, or Firm—Herbert L. Lerner; Laurence A. Greenberg

[57] ABSTRACT

A method for fault-tolerant communication under strictly real-time conditions in a local network uses a double bus architecture for reporting faults and for tolerating global bus faults. An active fault detection and notification mechanism is provided in order to safeguard consistency in the case of a fault and in order to comply with time limits regarding transmission of data. During fault-free operation, all of the process data are transmitted in one of the redundant bus systems and status information is transmitted in the other bus system. In the case of a fault, each bus is used as a watchdog bus in order to notify the network subscribers of faults occurring in the respective other bus system. The method can be used in process-oriented control and automation systems which have stringent requirements regarding reliability and real-time behavior.

4 Claims, 2 Drawing Sheets

METHOD FOR FAULT-TOLERANT COMMUNICATION UNDER STRICTLY REAL-TIME CONDITIONS

BACKGROUND OF THE INVENTION

FIELD OF THE INVENTION

The invention relates to a method for the reliable and fault-tolerant transmission of information with strictly real-time requirements in a local network, wherein an active fault detection and notification mechanism on the basis of a double bus architecture, that is to say redundant bus systems, is used.

The range of applications of a system based on the method according to the invention lies in the area of control and automation systems which are distributed in a process-oriented way and have to fulfill high reliability requirements.

Contemporary concepts for distributed control systems do not fulfill the requirements of high reliability and strictly real-time behavior to the same extent. For example, highly reliable systems are usually tailored to the features of higher levels of the automation hierarchy. Communication in those levels relates to large amounts of data to be transmitted, moderate timing requirements of the transmission of data and a relatively small number of communication subscribers (network nodes). Due to high overheads and the connection-oriented transmission principle, the communication protocol TCP/IP which is frequently used in that area is not capable of effectively transmitting small amounts of data which predominate in process-oriented systems. In addition, the bus access methods being used, for example CSMA/CD or token bus, can either not be used deterministically or can only be used in networks with a small number of nodes. Concepts for implementing fault tolerance in order to ensure a high degree of reliability and availability usually result in increased transaction times which cannot be tolerated in systems for which timing is critical.

That contrasts with protocols from the area of field and sensor/actuator buses, which protocols are optimized for use in process-oriented systems for which timing is critical. They permit short transaction times for the transmission of small amounts of information and are based on deterministic bus access methods.

The mechanisms for tolerating faults and for ensuring the system-wide consistency of data which are not sufficiently supported for high-reliability systems are a disadvantage of those protocols. In particular, in most cases no reliable, i.e. confirmed, broadcast transmission is supported. An example thereof is FIP (Factory Instrumentation Protocol). FIP permits a confirmed exchange of messages between two communication subscribers through a logic point-to-point connection, wherein the transfer of a message to a plurality of receivers takes place simultaneously (broadcast) but without acknowledgment of the correct reception. Thus, a confirmed broadcast communication can only be realized through the use of a plurality of sequential point-to-point transmissions. The long transaction times occurring during that process are unacceptable in systems for which time is critical, in particular in networks with a high number of subscribers (receivers).

Furthermore, buses, implemented with redundancy, of many field bus protocols are not supported and require additional measures which in turn have negative effects on the timing behavior and the consistency of data.

In summary, the requirements made of the method according to the invention, and the system features derived from the requirements, can be classified as follows:

high reliability and availability ensuring the system-wide consistency of data (even in the case of a fault) implementing fault tolerance strictly real-time behavior deterministic access method short transaction times The aforementioned requirements are fulfilled while taking into account the volume of messages which is typical for process-oriented communication: frequently messages with a short information length which are predominantly event-oriented, that is to say do not occur cyclically. Furthermore, it should be possible to connect a large number of nodes ($\approx 100$) to the system.

Systems with high reliability and availability must have fault-tolerant behavior. In other words, the functioning of the entire system is to be maintained despite faulty system components. Distributed systems deal with the multiplication and distribution of information to locally separated function modules. Multiplication and distribution must take place consistently, i.e. an item of source information must be present at all of the receivers in an identical state within a specific time. In conjunction with consistency, fault tolerance signifies that even when a fault occurs the consistency of the distributed data bases is to be preserved or restored before a propagation of faults leads to serious malfunctions of the entire system. The realization of fault tolerance takes place through the use of a redundant configuration of system components. For example, in a distributed system the failure of a bus line can only be tolerated by switching over to a redundant bus system. The switch-over process must take place with the shortest possible temporal interruption of the operation of the system so that the time limits within the system are not infringed. In addition, the consistency of the data bases must not be adversely affected, i.e. switching over must take place without loss, falsification and duplication of information. Those specifications demand very rapid fault detection, which is also referred to as fault latency, and a wide range of fault coverage. Furthermore, redundancy requires redundant components to be largely isolated in order to prevent propagation of faults to both systems.

The reliability of a distributed system is decisively determined by the transmission principle of the communication protocol. Reliability and consistency of data can only be achieved by effective confirmation mechanisms. That means that the receivers of a message must acknowledge the correct reception through the use of an acknowledgment to the transmitter. In that process, the degree of reliability increases with the number of confirming receivers. The maximum possible reliability of the transmission of data is obtained with the atomic broadcast principle: a message is either correctly received by all of the operationally capable network subscribers or it is received by none of them. That principle can be realized through the use of transmission concepts, such as the 2-phase repeat method, which use multiphase confirmation cycles:

1. A transmitter sends a message to all of the subscribers of its target group.
2. Each receiver confirms the correct reception of the data by transmitting an acknowledge message.
3. The transmitter waits for the acknowledgments within a maximum time period (time out).
4. If the acknowledgments arrive within the time out, the transmitter transmits an enable message and thus enables processing in the receivers.

Otherwise, the transmitter repeats the transmission of its message.

Multiphase concepts have a very high communication volume which leads to long transaction times and high bus

3 loading. Thus, they are unsuitable for strictly real-time systems. In that example it becomes apparent that measures for increasing the reliability usually have a negative influence on the timing behavior of the system, and vice versa. Therefore, the properties of reliability and strictly real-time behavior are difficult to combine.

SUMMARY OF THE INVENTION

It is accordingly an object of the invention to provide a method for fault-tolerant communication under strictly real-time conditions, which overcomes the hereinafore-mentioned disadvantages of the heretofore-known methods of this general type and which discloses a method for transmitting data in a local network, that satisfies both high reliability requirements and strictly real-time requirements.

With the foregoing and other objects in view there is provided, in accordance with the invention, a method for the reliable and fault-tolerant transmission of information with strictly real-time requirements in a local network, using an active fault detection and notification mechanism on the basis of a double bus architecture with redundant bus systems, which comprises transmitting all process data on a bus of one bus system as a process bus during fault-free operation, and transmitting status information of components and other information on a bus of another bus system during fault-free operation; notifying all network subscribers (network nodes) of faults with each bus serving as a watchdog bus, in the case of a fault in the other bus; triggering a switch-over of all of the network nodes to the other bus system and continuing the transmission of the process data on the fault-free bus, upon the notification of faults in the case of a process bus fault; and triggering no switch-over upon a notification of faults in the case of a fault in the bus which is not the process bus; providing all of the network nodes with two complete bus connections including a communication CPU, a communication controller and a transceiver; each communication CPU function monitoring another connection of its node and monitoring its connection component as a watchdog processor; and a communication CPU initiating a transmission of a fault message through its bus, after a detection of a fault in another connection of its node.

In accordance with another mode of the invention, there is provided a method which comprises function monitoring of all of the components and detecting all types of faults with fault detection mechanisms, by cyclically interchanging life signals of the two communication CPUs of a network node with one another for detecting a CPU failure; and transmitting a fault interrupt from a communication controller to the communication CPU of its connection when a permanent transmission fault is detected, and subsequently sending a notification from the communication CPU to the CPU of the other connection of the node; and carrying out a cyclical function monitoring of the components of a connection of a communication CPU by executing test routines; and executing self-test routines with a communication CPU for detecting its own faults.

In accordance with a further mode of the invention, there is provided a method which comprises consistently carrying out the switch-over in the case of a process bus fault, by setting fault latencies between the detection of a fault and a possible switch-over in most cases of faults so short that no loss of messages occurs; and setting a fault coverage so high that no falsification of messages remains undiscovered; and restoring a consistent system state in the case of possible losses, falsifications or duplications of messages with recovery mechanisms.

4

In accordance with a concomitant mode of the invention, there is provided a method which comprises using the CAN transmission protocol for both bus systems, by using the fault counter mechanism of CAN, by destroying a message which has been detected as faulty with a faulty CAN controller, and bringing about a continuous repetition of transmission, until its fault counter has reached a state 127; and initiating a transmission of a fault message to the watchdog bus through the watchdog processor, with a fault interrupt which has been transmitted from the CAN controller to the CPU at a fault counter state 96; and switching-over all of the network subscribers, possibly triggered by the fault message, to a fault-free bus while a forced repetition of transmission on a faulty bus is still taking place so that there is no loss of messages.

The method according to the invention uses a double-bus architecture. The redundant bus configuration serves on one hand to increase the system availability, where switching over to the second bus occurs in the case of a fault. On the other hand an active fault detection and notification mechanism is implemented. This mechanism provides for node faults to be detected through the use of watchdog processors and for all of the network subscribers to be informed of faults through the second bus system. Thus, rapid detection and treatment of component failures and thus consistent switching over to redundant components, i.e. without loss, falsification and duplication of messages, are possible. Both bus systems preferably use the CAN bus protocol since this has favorable properties for realizing the method according to the invention.

CAN, which was originally developed for use as a sensor/actuator bus in a motor vehicle, is suitable for wide areas of automation technology due to its flexibility. Above all, the realization of a highly reliable and effective atomic multicast transmission principle and the mechanisms for fault detection and fault tolerance make CAN a basis for highly reliable real-time systems.

The transfer of data in a CAN network takes place as follows:

1. A node (transmitter) transmits a message in the broadcast.
2. If any node discovers a transmission fault, it destroys the message while the transmission is still taking place by overwriting the bus level with a fault frame.
3. All of the nodes discard the destroyed message.
4. The transmitter starts a new transmission.

A negative confirmation mechanism is realized, i.e. the transmitter of a message considers its transmission to be correctly received by all of the network subscribers as long as no node destroys the message by overwriting. This procedure safeguards the system-wide consistency of the data since a message is either correctly received by all of the nodes or by none of them. This corresponds to the principle of the atomic broadcast.

In a fault-free case, the execution of a transaction (transmission of an item of information and acknowledgment by the receivers) requires the transmission of only one message. Thus, CAN is substantially more efficient (short transaction times, low bus loading) than other atomic broadcast protocols which use multiphase positive confirmation mechanisms (see above).

Each CAN node controls internal reception and transmission fault counters which are incremented after a transmission fault is detected and decremented after each fault-free transmission. If a fault counter reaches the value 127, the CAN module goes automatically from the fault active into the fault passive state, i.e. it can continue to transmit and receive messages but cannot destroy any faulty message by transmitting a fault frame. A CAN controller having a fault counter which reaches the value 256 switches into the bus off state, i.e. it no longer participates in the bus traffic in any way. This means that a faulty node disrupts the bus traffic by transmitting fault frames until it goes into the passive state.

A distributed system which uses solely the mechanisms provided by the CAN protocol has a number of disadvantages with respect to the requirements explained relating to high reliability and fault tolerance. The elimination of those disadvantages is the motivation for the method according to the invention.

The limitations of CAN are:

1. The management of redundancy is not provided for in the CAN protocol.
2. When a system component fails high fault latencies may occur under certain circumstances.

Regarding item 1.): The redundant realization of system components, in particular of the bus line in order to tolerate bus faults, requires additional mechanisms for the consistent switching over to redundant components in the case of a fault.

Thus, measures for fault detection, troubleshooting and controlling the switch-over process are to be implemented. An important aspect is the unambiguous specification of switch-over criteria, i.e. system states which trigger switching over.

Regarding item 2.): The negative confirmation mechanism of CAN has a disadvantage: the transmitter of a message does not detect the failure of another network subscriber but rather assumes that if fault frames do not occur all of the receivers have received its message without faults. It is attempted to eliminate it through the use of so-called lifeguarding methods. Lifeguarding is used to refer to the cyclical transmission of life messages by all of the network nodes. If the life message of a subscriber does not occur, that indicates a component fault within that node. Depending on the cycle time of the life messages, an unacceptably long time may pass until the node failure is detected so that a loss of messages occurs which leads to inconsistencies. Especially when there is a large number of connected nodes, the fault latencies are too high. In addition, the lifeguarding traffic increases the bus loading so that the access times for other messages may become too long and the time limits cannot be complied with. The method according to the invention avoids those problems through the use of an active fault detection and notification mechanism. In this case, each node is monitored through the use of a watchdog processor and the other network subscribers are notified of faults immediately through a second bus system.

Other features which are considered as characteristic for the invention are set forth in the appended claims.

Although the invention is illustrated and described herein as embodied in a method for fault-tolerant communication under strictly real-time conditions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
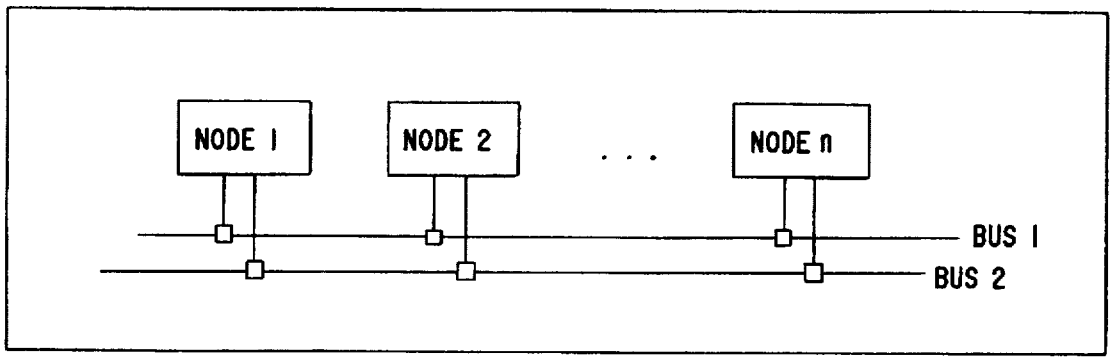
FIG. 1 is a schematic and block circuit diagram of a system structure having buses and nodes.
Figure 2:
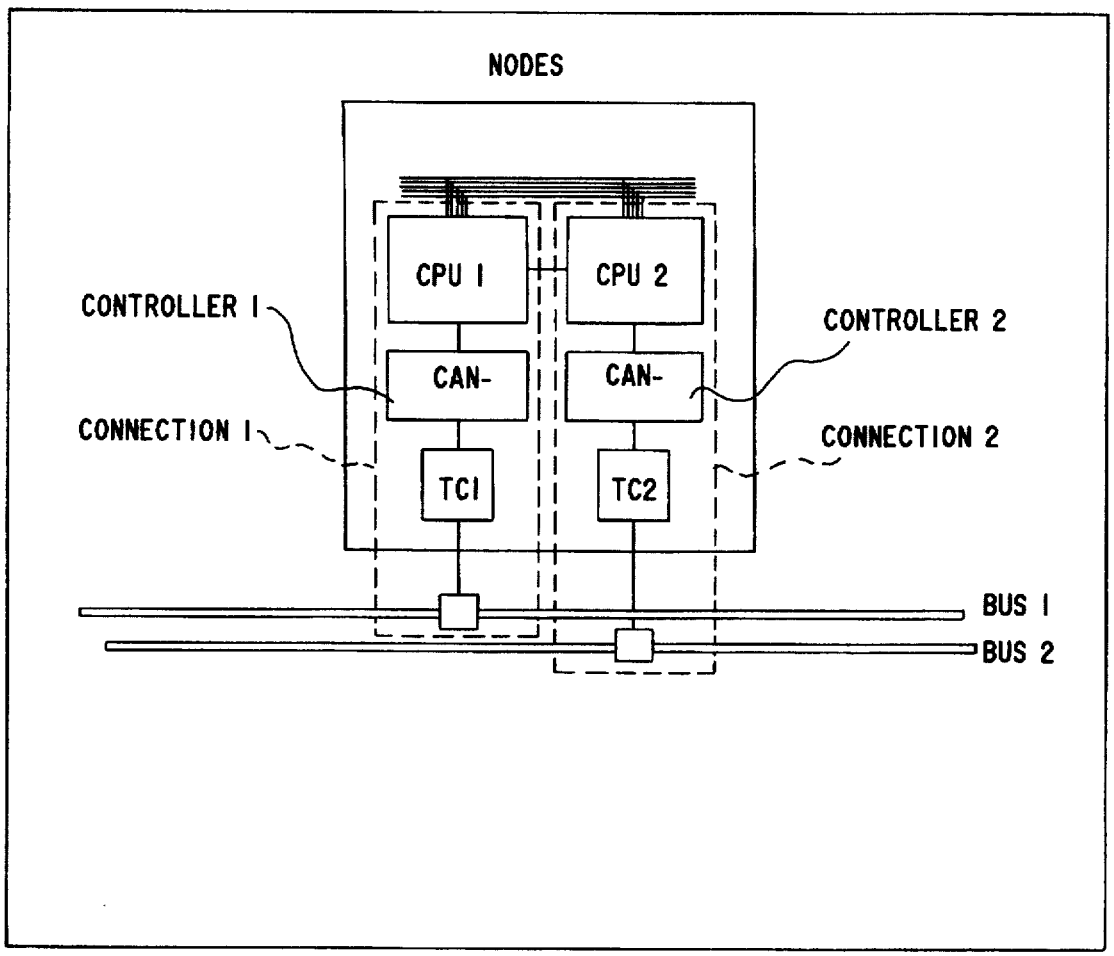
FIG. 2 is a view similar to FIG. 1 showing the structure of the network nodes.

Referring now to the figures of the drawings in detail and first, particularly, to FIG. 1 thereof, there is seen a system based on the method according to the invention, which includes a series of bus stations (nodes) that are coupled to one another through the use of two serial bus systems. Each node is connected to the two buses through the use of two separate connections, as is illustrated in FIG. 2. A connection includes at least one CAN communication controller, a communication CPU and a transceiver TC. The CAN controller executes all of the mechanisms specified in the CAN protocol. According to CAN specification 2.0 these include:

Message filtering

Packet formation

Bus access control

Fault detection

Fault signaling

Message confirmation

Synchronization

The transceiver carries out the physical connection of the node to a transmission medium. The parameters for an electronic coupling are specified in ISO/DIS 11898 Road vehicles—Interchange of Digital Information—Controller Area Network (CAN) for High-Speed Communication. A microcontroller is used as the communication CPU. The microcontroller initiates transmissions of data, selects received data and passes them on for processing. In addition, the mechanisms for redundancy management and for fault control (watchdog mechanisms, fault notification . . . ) which are implemented according to the method of the invention are executed by the communication CPU.

A bus structure or a star structure can be used as the bus topology. Both electrical transmission media such as twisted pairs and coaxial cables and optical waveguides can be used. The selection of topology and transmission medium must be made with regard to the restrictions on the number of nodes, the maximum data rate and bus length which are imposed by the CAN protocol.

The node-internal exchange of information between the communication CPUs takes place through a parallel bus. An additional serial connection can optionally be used. The aforementioned components serve to control the network communication. Further processing units are connected to the system through the parallel bus.

The method according to the invention includes mechanisms for the management of system faults. In order to clarify the method of operation, possible fault situations in a local network are given below.

Faults and failure situations of communication components can be classified in two categories:

Global faults prevent the communication of all of the network subscribers and thus disrupt the functioning of the entire system. Global faults may occur on one hand directly as a result of line defects and indirectly as a result of bus-blocking faults of the connected components. The term line faults is used to refer to short-circuits and interruptions in the bus line. Bus-blocking component faults can be short-circuits at the bus-side outputs of the CAN controller and the transceiver.

These faults lead to enduring blocking of the bus as a result of the generation of a permanent voltage level. Furthermore, the bus can be blocked from receiving other messages by the continuous transmission of a high-priority message. Global faults can be tolerated by switching over to a redundant bus system.

Local faults exclude a node from the system-wide communication and lead to an adverse effect on the functioning of the entire system to a greater or lesser extent depending on the functioning of the faulty subscriber. The term local faults covers all of the failures of CAN controllers, CPUs and transceivers which prevent those components from functioning but do not put the data traffic of the other bus subscribers at risk. They include, for example, line interruptions between a CAN module and a transceiver as well as between the transceiver and a bus line. Furthermore, they include internal module faults which lead to the loss or the falsification of data. Local faults can be tolerated by the redundant configuration of the components.

A distinction between a case of a fault and normal operation is made below. Normal operation will be understood to be the fault-free operating state including transient transmission and component faults which are tolerated by the fault mechanisms of the CAN protocol.

A distributed system on the basis of the method according to the invention tolerates both global and local faults in the area of the communication components. This is achieved through the use of a double bus structure and the redundant realization of the communication CPU, CAN controller and transceiver connection components. A particular advantage is the possibility of switching over to redundant components while maintaining the consistency of the distributed databases. Thus, complex recovery measures for restoring a correct system state after the occurrence of a fault are largely avoided. The basis of the method according to the invention is an active fault detection and signaling mechanism which is explained below with reference to examples.

During normal operation, the entire process data traffic is executed through a bus system (in this case a bus 1 seen in FIG. 2). The term bus system may be taken to mean a bus line and the associated CPU, CAN controller and transceiver connection components. During normal operation, the bus system 2 serves solely for transmitting status reports of its components and other messages. The communications CPU of a connection module or connection 2 monitors the operational capability of the connection module or connection 1 associated with its node and thus fulfills the function of a watchdog processor. Likewise, the connection 2 is monitored through the use of CPU 1. If a fault occurs in the bus system 1, the fault-detecting watchdog processor informs the other network subscribers by transmitting a fault report through the bus system 2 which thus fulfills the function of a watchdog bus. The fault message requests all of the network nodes, if appropriate after further system checks, to block the bus system 1 and handle the process data traffic through the bus 2.

Figure 3:
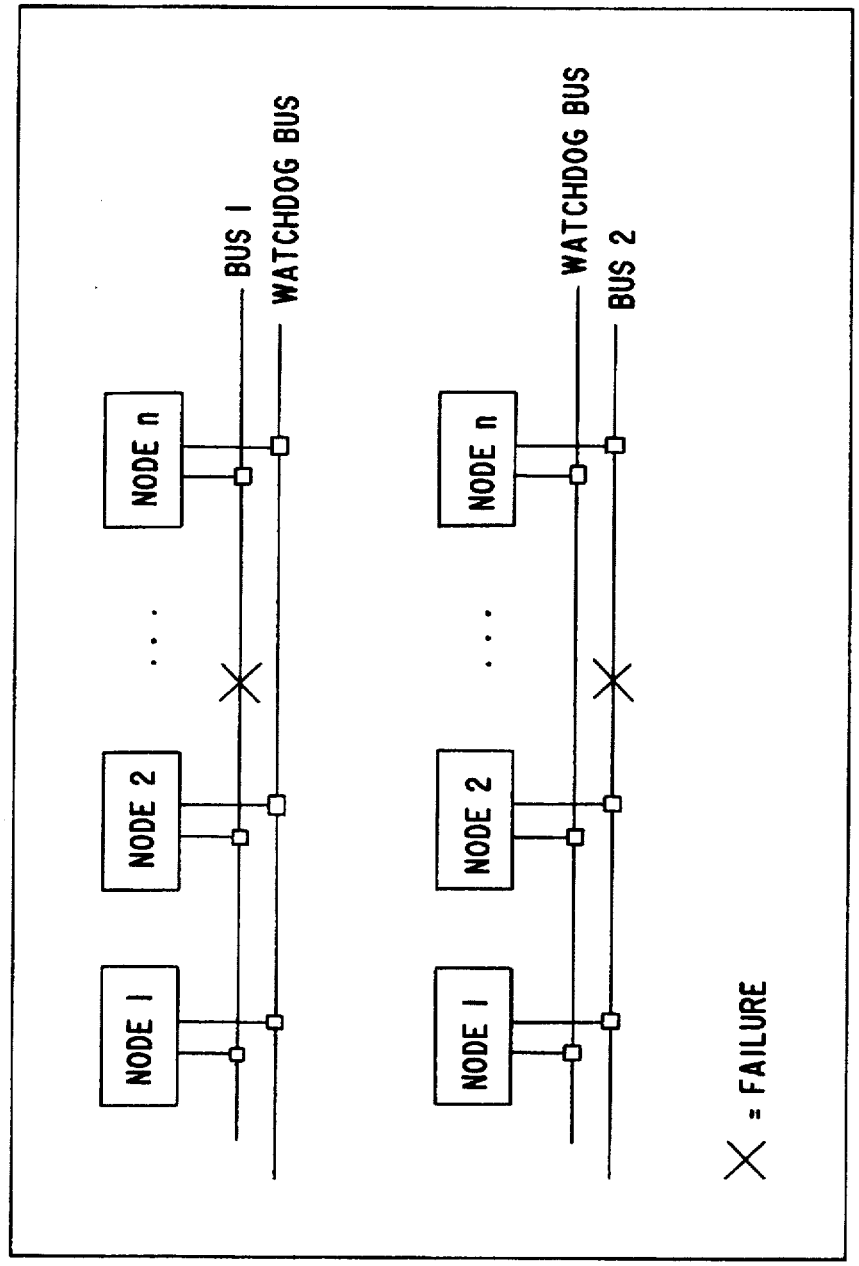
FIG. 3 is another view similar to FIG. 1 showing a watchdog function in the case of a fault.

If a CPU 1 detects a fault in the bus system 2, a fault report is issued through the bus system 1 but it does not lead to the switch-over between buses since the process data traffic is not affected. Both bus systems therefore serve as a watchdog bus in the detection of a fault in the respective other system as is seen in FIG. 3.

In accordance with the procedures described, a communication CPU fulfills five tasks:
control of the communication during normal operation
function monitoring of the connection module of the other bus system within the node
function monitoring of its own connection components
control of the transmission of fault reports after the fault is detected in the other bus system
coordination of the switch-over process The fault detection and signaling processes are distinguished from one another as a function of whether a CPU failure on one hand or a CAN controller, transceiver or line failure on the other hand, is present. The system reactions of both fault situations are explained below.

A line fault and malfunctions of CAN controllers or transceivers are usually manifested as a falsification of bus messages and discovered by the fault detection mechanisms of the CAN protocol, that is to say in the CAN modules. A CAN controller which discovers such a fault destroys the faulty message while its transmission is still taking place by transmitting a fault frame (see above). At the same time, the fault counters of all of the network nodes are incremented. If a local fault is present, the fault counter of the defective node is increased by 8, in accordance with CAN specification, and those of the other CAN controllers by 1, so that the faulty controller goes into the passive fault state first. If a fault counter of a CAN controller reaches the value 96, it transmits a fault interrupt to its communication CPU. This interrupt indicates highly disrupted bus traffic and notifies the CPU that the CAN controller will probably go into the passive state (fault counter state 127) soon. After the fault interrupt is received, the communication CPU reports the disruption to the associated watchdog processor. The latter then initiates the transmission of the fault notification through its bus system (now watchdog bus).

The advantage of this method lies in the fact that the switch-over process in the case of a process bus fault is executed while the CAN controller of the faulty node is still in the active fault state (fault counter state $\leq 127$). This controller therefore continuously destroys the message which is detected as being faulty up to the switch-over process. As a result, no message is lost up to the switch-over, no faulty message is processed and no message is duplicated. Thus, the preconditions for maintaining the consistency of data in the case of a fault are fulfilled. Furthermore, a node failure and the location of the failure are known immediately within the entire system, which is not the case in a usual CAN system (see above). Faults which occur in the components between bus and communications CPU (transceiver, CAN chip and connections) and are not covered by the CAN functions for fault detection are detected, according to the method of the invention, through the use of an additional monitoring mechanism. This mechanism is implemented in the software of the communication CPUs and it provides for a cyclical function monitoring of the components. When a fault occurs, the fault-detecting CPU in turn notifies the associated watchdog processor which informs the other nodes by transmitting a fault message concerning this through the watchdog bus.

The detection and handling of faults in the area of the communication CPUs is not provided for in the CAN protocol and requires an additional implementation according to the method of the invention. During normal operation, each CPU transmits cyclical life signals to the associated watchdog processor. If these signals do not occur, this indicates a CPU failure. If a CPU of the process bus is affected, the watchdog processor initiates the switch-over process by transmitting the fault report (see above). The cycles of the life signals are to be selected in such a way that the fault detection and switch-over takes place as far as possible without loss of messages. In addition to monitoring by the watchdog processor, a communication CPU executes self-tests. If malfunctions are detected as a result of these tests, the watchdog processor is notified in order to initiate the transmission of the fault report.

In the case of specific component faults, it may not be possible in certain circumstances to entirely exclude the loss of messages between the occurrence of the malfunction and the switch-over process. This situation can occur, for example, if the fault latency is greater than the duration of transmission of a message. In these cases, recovery measures which restore the consistent system state are to be implemented.

In summary, the criteria which lead to switching over to redundant components are classified as follows:

occurrence of a fault passive-interrupt of a CAN controller failure of life signals of a communication CPU to occur detection of a CPU fault by the self-test routines of a CPU detection of a CAN controller, transceiver or connection fault by the monitoring routines of a CPU.

Switching over only takes place if components of the process bus are faulty. Otherwise, the other system subscribers are merely notified of the fault.

We claim:

1. A method for a reliable and fault-tolerant transmission of information with strictly real-time requirements in a local network, using an active fault detection and notification mechanism on the basis of a double bus architecture with redundant bus systems, which comprises:

using a controller area network (CAN) transmission protocol on a double bus systems, by:

a) transmitting all process data on a bus of one bus system as a process bus during fault-free operation, and transmitting status information of components and other information on a bus of another bus system during fault-free operation;

b) notifying all network subscribers (network nodes) of faults with each bus serving as a watchdog bus, in the case of a fault in the other bus;

b1) triggering a switch-over of all of the network nodes to the other bus system and continuing the transmission of the process data on the fault-free bus, upon the notification of faults in the case of a process bus fault; and b1.1) carrying out the switch-over in the case of a process bus fault, by;

b1.1.1) setting fault latencies between the detection of a fault and a possible switch-over in most cases of faults so short that no loss of messages occurs;

b1.1.2) setting a fault coverage value; and b1.1.3) restoring a consistent system state in the case of possible losses, falsifications or duplications of messages with recovery mechanisms;

b2) triggering no switch-over upon a notification of faults in the case of a fault in the bus which is not the process bus;

c) providing all of the network nodes with two complete bus connections including a communication CPU, a communication controller and a transceiver;

c1) each communication CPU function monitoring another connection of its node and monitoring its connection component as a watchdog processor; and c2) a communication CPU initiating a transmission of a fault message through its bus, after a detection of a fault in another connection of its node.

2. The method according to claim 1, which comprises function monitoring of all of the components and detecting all types of faults with fault detection mechanisms, by:

a) cyclically interchanging life signals of the two communication CPUs of a network node with one another for detecting a CPU failure; and b) transmitting a fault interrupt from a communication controller to the communication CPU of its connection when a permanent transmission fault is detected, and subsequently sending a notification from the communication CPU to the CPU of the other connection of the node; and c) carrying out a cyclical function monitoring of the components of a connection of a communication CPU by executing test routines; and d) executing self-test routines with a communication CPU for detecting its own faults.

3. The method according to claim 1, which comprises:

a) using the fault counter mechanism of CAN, by:

a1) destroying a message which has been detected as faulty with a faulty CAN controller, and bringing about a continuous repetition of transmission, until its fault counter has reached a state 127; and a2) initiating a transmission of a fault message to the watchdog bus through the watchdog processor, with a fault interrupt which has been transmitted from the CAN controller to the CPU at a fault counter state 96; and a3) switching-over all of the network subscribers to a fault-free bus while a forced repetition of transmission on a faulty bus is still taking place so that there is no loss of messages.

4. The method according to claim 3, which comprises triggering the switch-over of all of the network subscribers to the fault-free bus with the fault message.

* * * * *